United States Patent [19]

Camm

[11] Patent Number: 4,627,668
[45] Date of Patent: Dec. 9, 1986

[54] RELAY VALVE

[75] Inventor: John J. Camm, East Malvern, Australia

[73] Assignee: Repco Limited, Australia

[21] Appl. No.: 651,300

[22] Filed: Sep. 17, 1984

[30] Foreign Application Priority Data

Sep. 28, 1983 [AU] Australia .............................. 1612/83

[51] Int. Cl.⁴ ............................................ B60T 15/02
[52] U.S. Cl. ....................................... 303/40; 303/56
[58] Field of Search ................... 137/627.5; 303/22 R, 303/40, 54, 56

[56] References Cited

U.S. PATENT DOCUMENTS 3,125,379  3/1964  Valentine .......................... 303/40 X
3,456,991  7/1969  Valentine et al. ................. 303/40 X Primary Examiner—Duane A. Reger
Attorney, Agent, or Firm—Stevens, Davis, Miller & Mosher

[57] ABSTRACT

A relay valve for a vehicle brake system having an operating piston which moves in one direction in response to entry of a control pressure into one part of the valve and which by that movement causes an orifice to open whereby working pressure is allowed to enter another part of the valve and pass from there through various outlets. There are six outlets and each is connected to a respective brake assembly of the vehicle brake system. A damping piston is connected to the operating piston so as to move therewith and is subjected to the same pressure as that acting against one side of the operating piston but in a manner such as to provide resistance to movement of the operating piston in the aforementioned one direction.

19 Claims, 9 Drawing Figures

RELAY VALVE

This invention relates to a relay valve which is operable in response to a control signal to open and thereby connect an outlet port or ports thereof to a source of pressurized fluid. Such valves are used in vehicle brake systems and particularly pneumatic brake systems, and the present invention is especially concerned with brake system relay valves. It will be convenient to hereinafter describe the relay valve of the present invention in relation to vehicle air brake systems, but it may be usable in other brake systems.

The control signal for a relay valve of the foregoing kind is derived from a source of pressurized fluid and the pressurized air to be passed to the outlet ports when the valve opens is derived from another relatively large volume of working supply source. Each outlet port of the valve communicates with a respective brake which is to be operated by the pressurized air of the working supply. The control source fluid may be air also and that source may be of relatively low volume so that the relay valve acts to amplify the control signal.

A particular application for such a relay valve is in the air brake systems of semi-trailers where a low volume control signal is applied in response to operation of the vehicle brake pedal, and the relay valve then operates to connect a high volume source of working compressed air to the brake assemblies so as to cause operation of the brakes. The control signal pressure is approximately proportional to the foot pressure applied to the brake pedal and the relay valve is operable to apply a generally proportional pressure of the working compressed air to the brake assemblies.

Relay valves of the foregoing kind have been reasonably satisfactory in air brake systems for semi-trailers having two axles and requiring operation of four separate brake assemblies. In that particular application, the relay valve has four outlets, each of which is connected to a respective brake assembly. It is now quite common however, for a semi-trailer to have three axles and therefore six separate brake assemblies. Conventional relay valves have proven to be inadequate for such applications when modified to enable operation of six brake assemblies. One particular problem with such modififed valves is that they suffer instability under brake applying conditions such that the valve continually "hunts" between open and closed positions and that reduces the effectiveness of the brake system.

Because of the foregoing problem, it is common practice to use two four-port relay valves in a tri-axle brake system. One valve is connected to four of the brake asemblies and the other valve has two of its outlet ports closed and the other two are connected to the remaining two brake assemblies.

It is an object of the present invention to provide a relay valve in which the problem of "hunting" is overcome or is at least substantially reduced. It is a further object of the invention to provide such a relay valve which can be connected to six separate brake assemblies. It is yet another object of the invention to provide such a valve which incorporates a number of parts of a conventional four-port relay valve.

According to the present invention, there is provided a relay valve for use in a vehicle brake system including, a control chamber connectable to a source of control pressure, an operating member exposed to said control chamber and being movable in one direction under the influence of said control pressure, an inlet connectable to a source of working pressure, a feed chamber, a plurality of outlets connected to said feed chamber, closure means responsive to movement of said operating member in said one direction to open communication between said inlet and said feed chamber, a damping chamber connectable to a pressure source, and a damping member exposed to said damping chamber and being operative in response to pressure therein to resist movement of said operating member in said one direction.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

Figure 1:
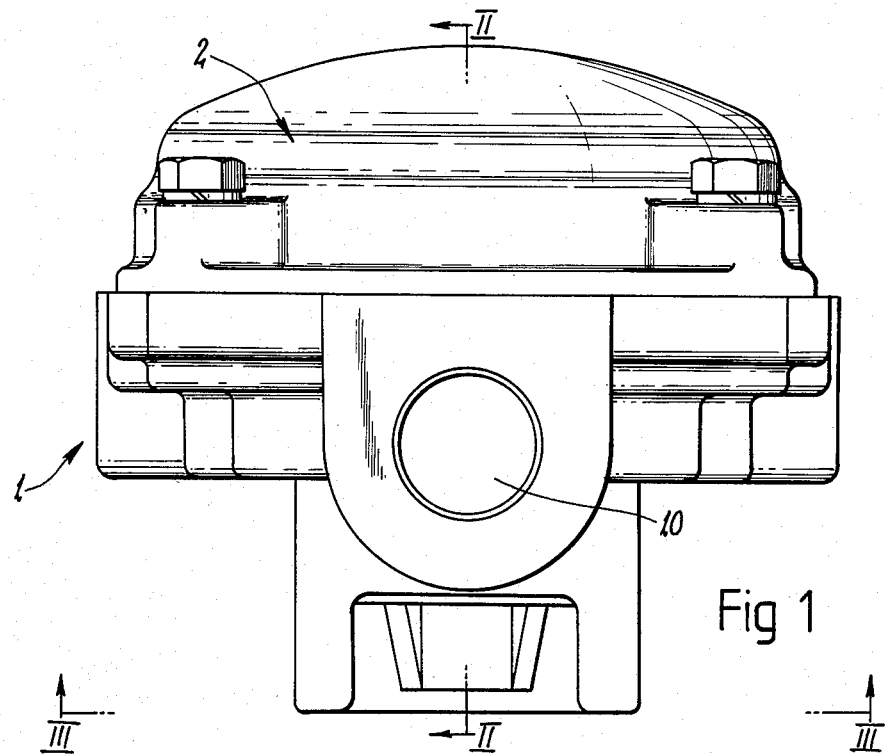
FIG. 1 is a side elevational view of one form of relay valve incorporating the present invention.

The example relay valve 1 shown in the drawings includes a body having therein a main cylindrical compartment 3 in which an operating piston 4 is movable. The piston 4 divides the compartment 3 into two chambers 5 and 6. The chamber 5 is, in use, connected to the control source 7 (FIG. 4) through a port 32 and forms a control chamber, and the other chamber 6 functions as a feed chamber.

Figure 4:
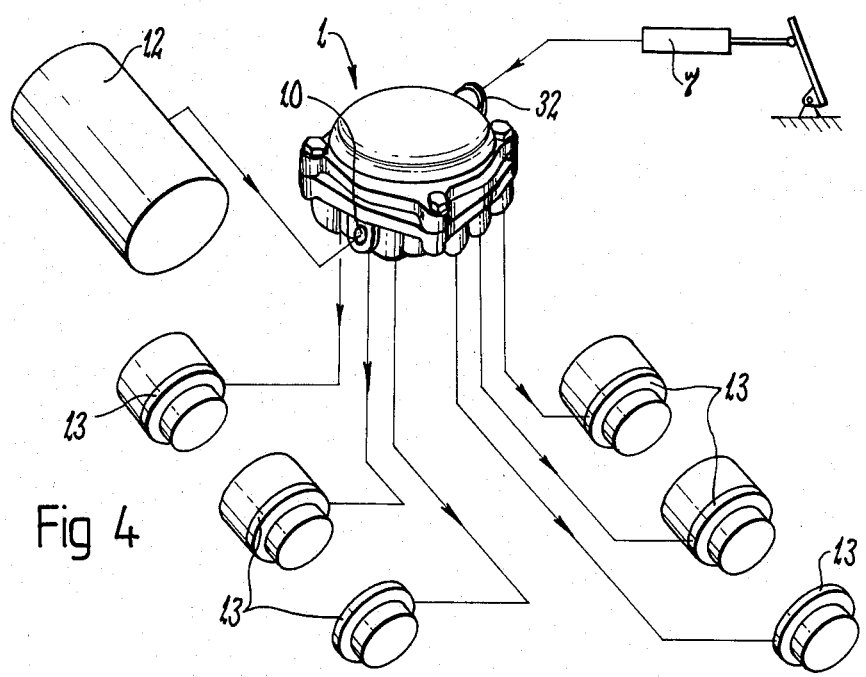
FIG. 4 is a semi-diagrammatic isometric view of the valve according to FIG. 1 connected into a brake system including six separate brake assemblies.

The operating piston 4 is connected to valve operating means which, in the particular construction shown, is in the form of a rod 8 extending through and beyond the feed chamber 6. The rod 8 is operative to open a valve orifice 9 so as to provide a communication path for working fluid between an inlet port 10 and a plurality of outlet ports 11 which communicate with the feed chamber 6. In use, the inlet port 10 is connected to the working supply source 12 and the outlet ports 11 are connected with respective brake assemblies 13 (FIG. 4). In operation the operating piston 4 moves within the main compartment 3 in response to pressure applied within the control chamber 5, and the rod 8 is then operative to open the valve orifice 9 and thereby connect the outlet ports 11 with the inlet port 10. When the valve 1 is not so operated, the ports 10 and 11 are isolated from one another.

The valve 1 also includes closure member 14 which, in the arrangement shown, is biased by a spring 15 towards a valve closing position at which it prevents communication between the ports 10 and 11 through the orifice 9. The closure member 14 is preferrably in the form of a sleeve having a head portion 16 which is arranged to engage with an annular valve seat 17 provided around the orifice 9. The closure member 14 is preferably arranged within an inlet compartment 18 which connects with the inlet port 10 through a passage 19.

In the construction shown, the body 20 of the closure member 14 is cylindrical and is slidably mounted in a cylindrical bore 21 of the valve 1 for movement towards and away from the valve seat 17. A fluid tight seal 22 is preferably provided between the body 20 and bore 21 and the bore 21 is able to communicate with atmosphere through an exhaust port 23. As shown, a flap valve 24 operates to close the port 23 against ingress of direct and other foreign material.

The central bore 25 through the closure member 14 provides a passage through which the feed chamber 6 may also communicate with atmosphere by way of the port 23. That communication is closed under certain conditions by a flange 26 connected to the rod 8 for movement therewith and arranged to engage the head portion 16 of the closure member 14 at a location radially inwardly of the annular valve seat 17. The flange 26 thereby functions to close off the feed chamber 6 against communication with atmosphere through the bore 25 and exhaust port 23.

Figure 2:
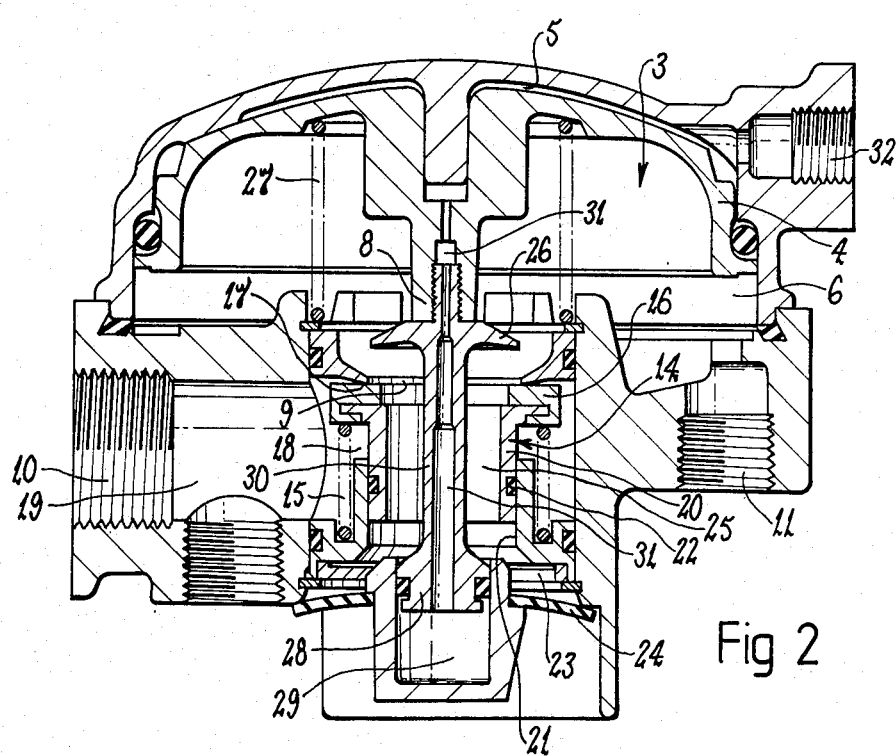
FIG. 2 is a cross sectional view taken along line II—II of FIG. 1.
Figure 5:
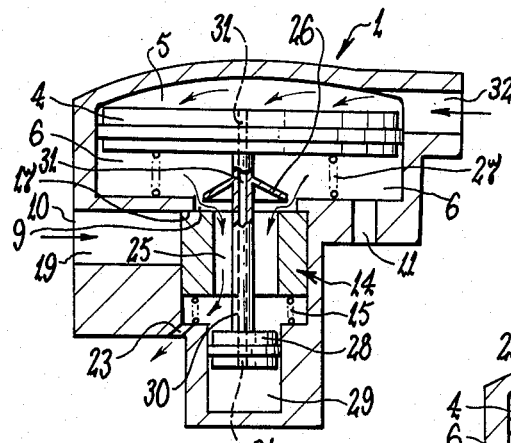
FIG. 5 is a view similar to FIG. 2 but shown in diagrammatic form.
Figure 6:
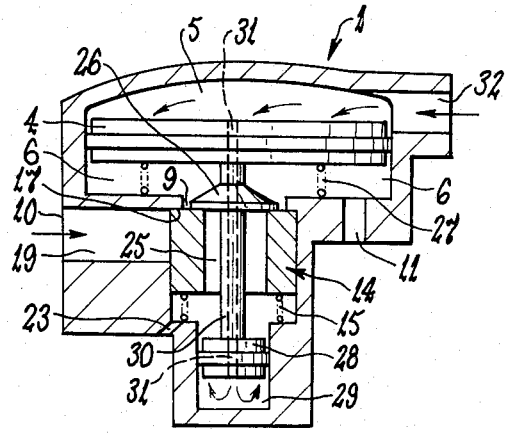
FIG. 6 is a view similar to FIG. 5 but showing the first stage of opening the valve after introduction of control pressure.
Figure 7:
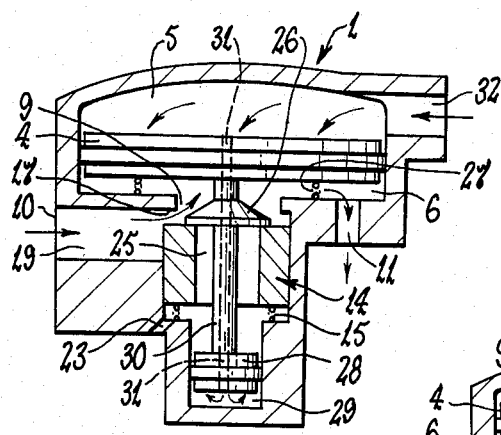
FIG. 7 is a view similar to FIG. 6 but showing the valve open.

In operation of the relay valve 1 described above, the supply source 12 does not initially supply pressurized air to the feed compartment 6 because the operating piston 4 is in the position shown in FIGS. 2 and 5. In that position, the flange 26 is lifted from the head portion 16 of the closure member 14 and the feed chamber 6 is open to atmosphere through the bore 25 in the closure member 14 and the exhaust port 23. At the same time, the closure member 14 bears against the valve seat 17 under the action of the biasing spring 15 so as to close the orifice 9 such that the inlet port 10 is isolated from the feed chamber 6. When a control signal in the form of pressurized fluid is applied to the control chamber 5, the operating piston 4 moves against its biasing spring 27 so as to bring the flange 26 into engagement with the head portion 16 of the closure member 14 and therby close the feed chamber 6 against communication with atmosphere (FIG. 6). Further movement of the operating piston 4 in the same direction causes the rod 8, acting through the flange 26, to move the closure member 14 away from the valve seat 7 thereby opening the valve and allowing the working fluid to pass from the inlet port 10 to the feed chamber 6 and thence to the outlet ports 11 (FIG. 7).

When the valve 1 is opened as described above, the air pressure in the feed chamber 6 rapidly rises until its effect exceeds the effect of the pressurized fluid in the control chamber 5. The operating piston 4 then reverses its direction of movement so that the closure member 4 is able to close against the valve seat 17 (FIG. 8), thereby again isolating the feed chamber 6 from the working supply. Ideally at this point, the effects of the respective presures witin the feed and control chambers are balanced so that the valve 1 is in a stable condition and consequently the pressure communicated through the outlet ports 11 is constant and proportional to the control fluid pressure.

A valve arrangement as generally described above is in accordance with the prior art except that prior valves of that form would not have more than four outlet ports 11. As previously advised, such four-port valves have not been successfully adapted for tri-axle brake systems so that two such valves have been required in such systems and that has naturally added to the cost of the braking system.

A relay valve for semi-trailer brake systems must have certain minimum response times for application of working compressed air to the brake assemblies and for releasing the compressed air from the brakes by opening the feed chamber to atmosphere. In order that a six port relay valve will satisfy the desired response times, it has been found necessary to substantially increase the dimensions of the closure member bore 25 and the flange 26. Under certain conditions however, those changes lead to the problem of "hunting", and that problem has been particularly prevalent when the ratio of the effective area of the operating piston 4 to the effective area of the flange 26 is less than about 30:1.

The problem of "hunting" occurs when the valve is attempting to reach a stable condition but continually over-balances or overshoots that condition. When control pressure is applied to the valve and the valve operates in a normal manner to relay the working supply to the outlet ports, the stable condition as eventually adopted by the valve is that shown in FIG. 8. However, if the control pressure is reduced to a lower increment, the excess of pressure in the feed chamber 6 will cause the operating piston 4 to move so as to lift the flange 26 from the head portion 16 of the closure member 14. The feed chamber 6 is thereby opened to atmosphere and some pressure will escape from the brake assemblies 13 through that chamber 6 in order to again approach a balance with the control pressure.

Figure 8:
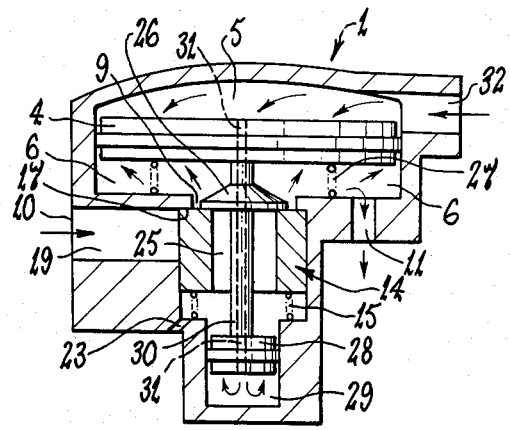
FIG. 8 is a view similar to FIG. 7 but showing the valve returned to a closed and balanced condition.

If the closure member bore 25 and the flange 26 are relatively large, it is found that excess air may be exhausted to atmosphere before the control pressure forces the flange 26 to close the upper end of the closure member bore 25. As a result, when the flange 26 does close that bore 25, the effect of the control pressure will then exceed the effect of the pressure remaining in the feed chamber 6 so that the operating piston will continue to move beyond the balance position as shown in FIG. 8 and will thereby open the valve to allow working fluid to again enter the feed chamber 6. Furthermore, excess pressure build-up may occur in the feed chamber 6 before the valve has time to reclose so that the operating piston 4 is moved to reopen communication between the feed chamber 6 and atmosphere. Such continual overbalancing is known as "hunting" and the effect may cause a blow down of the air reservoir 12 which forms the working supply and will also create a variable feeling at the brakes.

A relay valve according to the present invention meets that problem by inclusion of a damping facility. In the particular construction shown, a damping piston 28 is connected to the operating piston 4 and is exposed on one side to a damping chamber 29. That chamber 29 is located on the side of the piston 28 remote from the flange 26 so that fluid pressure in the damping chamber 29 provides a balancing pressure on the damping piston 28 opposing the pressure on the valve 1 which tends to open the valve. With such an arrangement, the pressure acting on the damping piston 28 tends to balance the instability producing effects on the flange 26 so that a relatively large bore 25 may be provided in the closure member 14 and a relatively large flange 26 can be provided without leading to "hunting".

The damping cylinder may be arranged as shown so as to be at the side of the valve body 2 remote from the control chamber 5. Also in the arrangement shown, the damping piston 28 is carried by an extension 30 of the rod 8 which extends beyond the flange 26 and through both the valve orifice 9 and the bore 25 of the closure member 14.

Figure 2A:
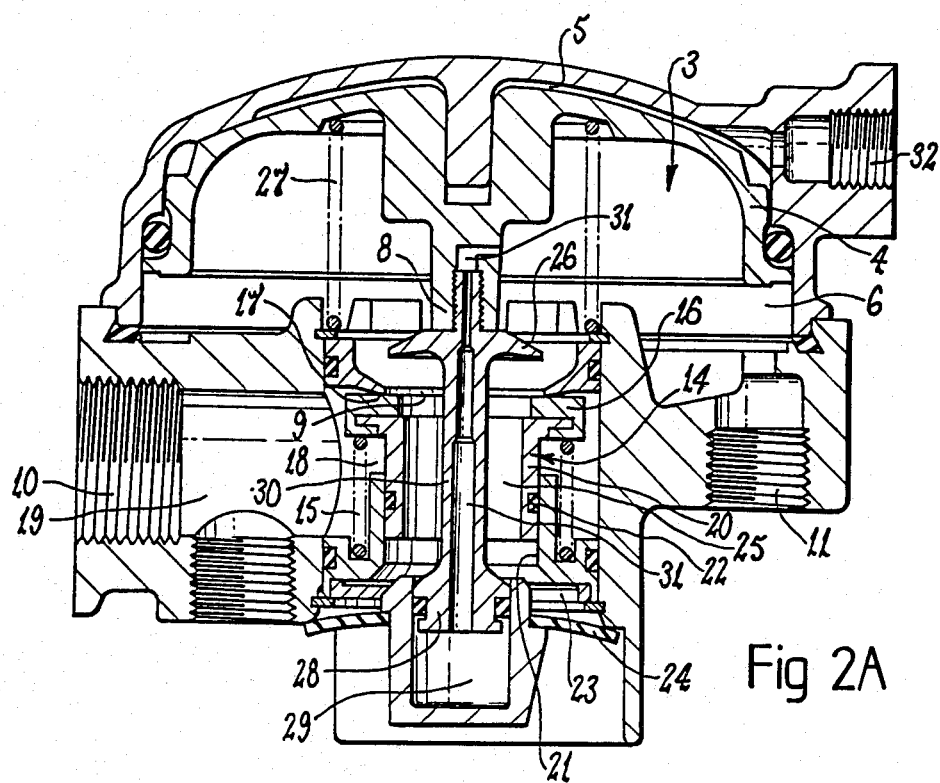
FIG. 2A is a cross-sectional view similar to FIG. 2 illustrating a further embodiment of the invention wherein the feed chamber may communicate with the damping chamber.
Figure 3:
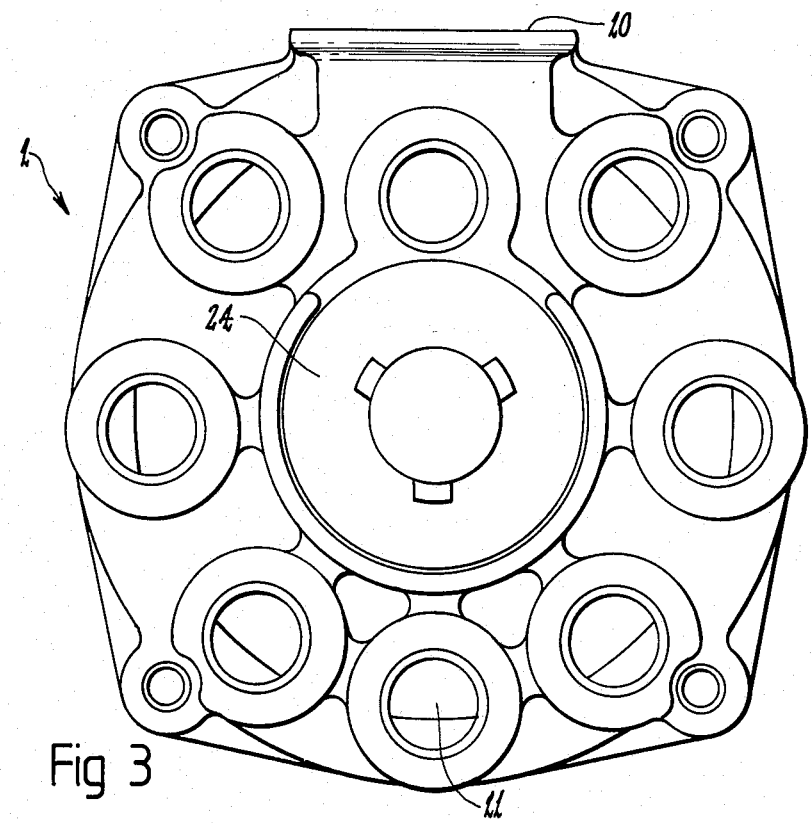
FIG. 3 is a view taken in the direction of line III—III of FIG. 1.

The damping chamber 29 is preferably connected to the source of control pressure and that may be achieved as shown in FIG. 2 by providing communication between that chamber and the control chamber 5. In an alternative arrangement, the damping chamber 29 may be in communication with the feed chamber 6 as shown in FIG. 2A, but is usually preferable for the damping chamber 29 to be in communication with the control chamber 5. That communication may be effected by means of a passage 31 extending through the rod 8, the extension 30, and both the damping piston 28 and the operating piston 4.

The effective surface area of the damping piston 28 which is exposed to the pressure in the chamber 29 preferably approximately equal to or slightly less than the effective area of the flange 26 which is exposed to pressure within the feed chamber 6 when the valve is in the condition of FIGS. 7 or 8. As a result the pressure effects on the damping piston 28 and the flange 26 are substantially balanced and that reduces the possibility of instability such as to cause "hunting". That result occurs even in a valve having a relatively large bore 25 through the closure member 14 and a correspondingly large flange 26 such that the ratio of the effective area of the operating piston 4 to the effective area of the flange 26 is less than about 30:1.

It has been found that a relay valve having the damping facility described above can be also provided with six outlet ports 11 and can therefore be used for triaxle brake systems. The required application and release times can be achieved in such a valve by adopting a suitably large closure member bore 25 and flange 26.

When control pressure is applied to the chamber 5 from the source 7, the same pressure is communicated to the underside of the damping piston 28 by way of the passage 31. A balancing force is thereby generated within the valve 1 and acts against the downward movement of the operating piston 4 so as to generally balance the downward force on the flange 26 when the pressure within the feed chamber 6 has built-up to the required level. That is, the valve 1 adds a positive pressure under the piston 4 to offset pressure effects on the flange 26 which can lead to instability and "hunting".

The relay valve illustrated in the accompanying drawing is provided with six outlet ports 11 extending from the feed chamber 6 and can therefore be used with triaxles. The same construction however, can be provided with a lesser or greater number of outlet ports 11. A six- port valve as shown can be formed by using much of the existing tooling used for production of four port relay valves. Also, the overall size of the six-port valve can be substantially the same as a conventional four-port relay valve. As a result, a six-port relay valve according to the present invention can be produced and used in a triaxle system at less cost than that involved in the present practice of using two four-port relay valves.

Various alterations, modifications and/or additions may be made to the construction and arrangement of parts as herein described without departing from the spirit and scope of the present invention as defined by the appended claims.

Having now described my invention what I claim as new and desire to secure by Letters Patent is:

1. A relay valve for use in a vehicle brake system including, a hollow body, a main compartment within said body, an operating piston slidable within said compartment and dividing it into control and feed chambers, a control port connected to said control chamber, a plurality of outlet ports connected to said feed chamber, an inlet compartment formed within said body, an inlet port connected to said inlet compartment, an orifice through which said feed chamber communicates with said inlet compartment, a closure member mounted within said body for movement towards and away from a position at which it closes said communication through said orifice, means operatively connecting said closure member and said operating piston so that said closure member moves away from said communication closing position in response to movement of said operating piston in one direction, a damping chamber formed within said body, a damping piston slidable within said body and exposed to said damping chamber, passage means connecting said damping chamber to one of said control and feed chambers so that the pressure within that chamber acts on said damping piston to thereby cause resistance to movement of the operating piston in said one direction, said operating and damping pistons being connected to respective opposite ends of a rod which is coaxial with each said piston, and said passage means includes a passage extending axially within said rod.

2. A relay valve according to claim 1, wherein there are six said outlet ports.

3. A relay valve according to claim 1, wherein said one direction is such as to cause expansion of said control chamber and said passage means connects said damping chamber to a said chamber of the main compartment.

4. A relay valve according to claim 3, wherein said passage means connects said damping and control chambers.

5. A relay valve acording to claim 1, wherein an abutment provided on said rod is engagable with said closure member to move that member away from said communication closing position, and spring means urges said closure member towards said communication closing position.

6. A relay valve according to claim 5, wherein said abutment has a surface exposed to pressure within said feed chamber, and the surface of said damping piston which is exposed to pressure within said damping chamber is not greater than the area of said abutment surface.

7. A relay valve according to claim 6, wherein said areas are substantially equal.

8. A relay valve according to claim 6, wherein the ratio of the respective area of the operating piston and the abutment which are exposed to fluid pressure is no greater than 30 to 1.

9. A relay valve according to claim 5, wherein an open ended bore is provided through said closure member and is arranged substantially coaxial with said orifice, said rod extends through said bore, said abutment is in the form of a flange which closes one end of said bore when said abutment and closure member engage, and said feed chamber communicates with atmosphere through said bore.

10. A relay valve according to claim 1, wherein one side of said damping piston is exposed to pressure within said damping chamber and the opposite side thereof is exposed toatmosphere.

11. A relay valve for use in a vehicle brake system including, a control chamber connectable to a source of control pressure, an operating member exposed to said control chamber and being movable in one direction under the influence of said control pressure, an inlet connectable to a source of working pressure, a feed chamber, a plurality of outlets connected to said feed chamber, closure means responsive to movement of said operating member in said one direction to open communication between said inlet and said feed chamber, a damping chamber connectable to a pressure source, a damping member exposed to said damping chamber and being operative in response to pressure therein to resist movement of said operating member in said one direction, a passage through said closure means, said feed chamber communicating with atmosphere through said passage, an abutment member connected to both said operating and damping members for movement therewith and to engage said closure means to cause said response to operating member movement and to also close said passage, and the ratio of the respective areas of said operating and abutment members which are exposed to pressure within said valve is no greater than 30 to 1.

12. A relay valve according to claim 11, wherein said damping chamber is connectable to said control pressure source and that connection is effected through said control chamber.

13. A relay valve according to claim 11, wherein said operating member is exposed to said control and feed chambers on respective opposite sides thereof, and said valve means is operative to close said communication between the inlet and the feed chamber when the pressure is substantially the same within the feed and control chambers.

14. A relay valve according to claim 13, wherein a connection exists between said operating and damping members such that each follows movement of the other, a surface of said connection is exposed to said feed chamber and is arranged so that pressure within the feed chamber acts on that surface and produces a force tending to move said operating member in said one direction thereof, and means provided on said connection co-acts with said closure means to cause the closure means to open said communication.

15. A relay valve according to claim 14, wherein substantially equal areas of said operating member are exposed to said control and feed chambers respectively, and substantially equal areas of said connection surface and said damping member are exposed to said feed and damping chambers respectively.

16. A relay valve according to claim 14, wherein said surface of the connection is provided on said coacting means.

17. A vehicle brake system including a valve according to claim 1, a source of control pressure connected to said control port, a source of working pressure connected to said inlet port, and a plurality of brake assemblies each of which is connected to a respective said outlet port.

18. A vehicle brake system according to claim 17, wherein there are six said brake assemblies, pressure within said feed chamber acts on both said operating member and another member arranged in opposed relationship to said operating member, and the ratio of the respective areas of the two said members exposed to the feed chamber pressure is no greater than 30 to 1.

19. A vehicle brake system according to claim 18, wherein means is provided within said valve whereby said feed chamber communicates with atmosphere, and said other member causes said response of the closure means to the operating member movement and simultaneously closes said communication means.

* * * * *